United States Patent [19]

Nakahara

[11] Patent Number: 5,077,759

[45] Date of Patent: Dec. 31, 1991

[54] PHASE ADJUSTING SYSTEM FOR A RADIO COMMUNICATION SYSTEM

[75] Inventor: Kenji Nakahara, Tokyo, Japan

[73] Assignee: NEC Corporation, Japan

[21] Appl. No.: 308,814

[22] Filed: Feb. 9, 1989

[30] Foreign Application Priority Data

Feb. 10, 1988 [JP] Japan ................................ 63-27613

[51] Int. Cl.[5] .............................................. H04L 7/02

[52] U.S. Cl. ....................................... 345/107; 455/53

[58] Field of Search .................... 375/107; 455/68, 33, 455/51-54, 67; 370/95.1, 105.3; 379/60, 63

[56] References Cited

U.S. PATENT DOCUMENTS

| | | | |
|---|---|---|---|
| 4,255,814 | 3/1981 | Osborn | 455/51 |
| 4,475,246 | 10/1984 | Batlivala et al. | 455/51 X |
| 4,696,052 | 9/1987 | Breeden | 455/51 |

*Primary Examiner*—Douglas W. Olms
*Assistant Examiner*—Tesfaldet Bocure
*Attorney, Agent, or Firm*—Laff, Whitesel, Conte & Saret

[57] ABSTRACT

A phase adjusting system for a radio communication system comprises a central station including a CPU, a memory, a delay time detecting circuit, and delay time setting circuits, plural transmitter connected to the central station, and plurality receivers arranged to receive signal from a corresponding one of the plural transmitters. Target number is assigned to each of the plural transmitters to be thereby designated one by one, and the memory stores sequential order of the target number to perform the phase adjustment of the plural transmitters in the sequential order. In the memory, the sequential order of the target number is changed by an external terminal, so that the sequential order of the plural transmitters is changed in phase adjustment without changing the target number.

4 Claims, 6 Drawing Sheets

| TARGET NUMBER | REFERENCE NUMBER |
|---|---|
| 1 | 2 |
| 2 | 3 |
| 3 | NONE |
| 4 | 3 |
| | |

| SEQUENCE NUMBER | TARGET NUMBER |
|---|---|
| 1 | 2 |
| 2 | 1 |
| 3 | 4 |
| | |

| SEQUENCE NUMBER | TARGET NUMBER |
|---|---|
| 1 | 4 |
| 2 | 2 |
| 3 | 1 |

PHASE ADJUSTING SYSTEM FOR A RADIO COMMUNICATION SYSTEM

FIELD OF THE INVENTION

The invention relates to a phase adjusting system for a radio communication system, and more particularly to a phase adjusting system for a radio communication system such as a paging system in which the sequential order of phase adjustment is changed among a plurality of transmitters.

BACKGROUND OF THE INVENTION

One type of a conventional phase adjusting system for a radio communication system such as a paging system comprises a plurality of transmitters each connected to a central station, and a plurality of receivers each connected for phase adjustment to the central station and positioned between corresponding two of the transmitters. The central station comprises a CPU for controlling the system, and a plurality of delay time setting circuits each provided on a line connected to a corresponding one of the transmitters. Among the transmitters, the sequential order of the phase adjustment is fixed beforehand, wherein a transmitter which plays a role for a standard in the phase adjustment is called "a reference", and a transmitter which is adjusted in phase is called "a target".

In operation, a transmitter which is No. 1 in the sequential order of the phase adjustment is regarded as the reference for the first phase adjustment, and a transmitter which is No. 2 therein is the target, so that signal is transmitted from the central station through the delay time setting circuit to the transmitter No. 2, then from the transmitter No. 2 to the corresponding receiver, and from the receiver back to the central station, and further signal is transmitted from the central station through the delay time setting circuit to the transmitter No. 1, then from the transmitter No. 1 to the corresponding receiver, and from the receiver back to the central station. In the central station, delay times are detected in the signals transmitted through the transmitters Nos. 1 and 2 for the reference and target. The difference of the delay times is calculated, so that a value corresponding to the difference is set in the delay time setting circuit for the target transmitter No. 2 to decrease the difference to a sufficient extent.

In the second phase adjustment, the transmitter No. 2 is for the reference, and a transmitter which is No. 3 in the sequential order is selected for the target, so that the same phase adjustment as in the first phase adjustment is performed between the transmitters Nos. 2 and 3. In this manner, all the transmitters are adjusted in phase.

In the above phase adjusting system, each of the transmitters comprises a memory for storing its own sequential order for the phase adjustment, so that one of the transmitters is turned on in accordance with the designation of the number in the sequential order from the central station, and turned off in accordance with the cease of the designation thereof. Therefore, the phase adjustment can be repeated sequentially only by designating the number in the sequential order.

In the conventional phase adjusting system, however, there is a disadvantage that it is difficult to change the sequential order of the phase adjustment because a content of the memory for each of the transmitters is inconvenient to be changed due to the fact that almost all of the transmitters are installed in stations having no staff for maintaining the stations. Even if the content of the memory is changed in the station by dispatching a staff thereto, a considerable time is consumed. During the time, therefore, the phase adjustment operation must be ceased, so that the change of delay times is not corrected.

SUMMARY OF THE INVENTION

Accordingly, it is an object of the invention is to provide a phase adjusting system for a radio communication system in which the sequential order of phase adjustment is changed in a central station among a plurality of transmitters.

According to the invention, a phase adjusting system for a radio communication system comprises a central station including a CPU for controlling the whole system, a memory for storing target number to be described later, a delay time detecting circuit for detecting delay time of a target transmitter designated among plural transmitters, and delay time setting circuits each setting a predetermined delay time for a corresponding one of the plural transmitters. When output of the target transmitter is turned on, the output is received in a corresponding receiver among plural receivers, and then transmitted from the corresponding receiver to the delay time detecting circuit in which delay time of the target is detected. The detected delay time is corrected in a corresponding one of the delay time setting circuits as a result of comparison between the detected delay time and a reference delay time. In the memory the target number of the plural transmitters is stored sequentially, so that phase adjustment of the plural transmitters is performed in sequential order stored in the memory. Therefore, sequential order of the plural transmitters is change in the phase adjustment only by changing the sequential order of the memory. This means that it is not necessary to change the target number assigned to the plural transmitters.

BRIEF DESCRIPTION OF THE DRAWINGS

The invention will be described in more detail in conjunction with appended drawings wherein.

DESCRIPTION OF PREFERRED EMBODIMENTS

Figure 1:
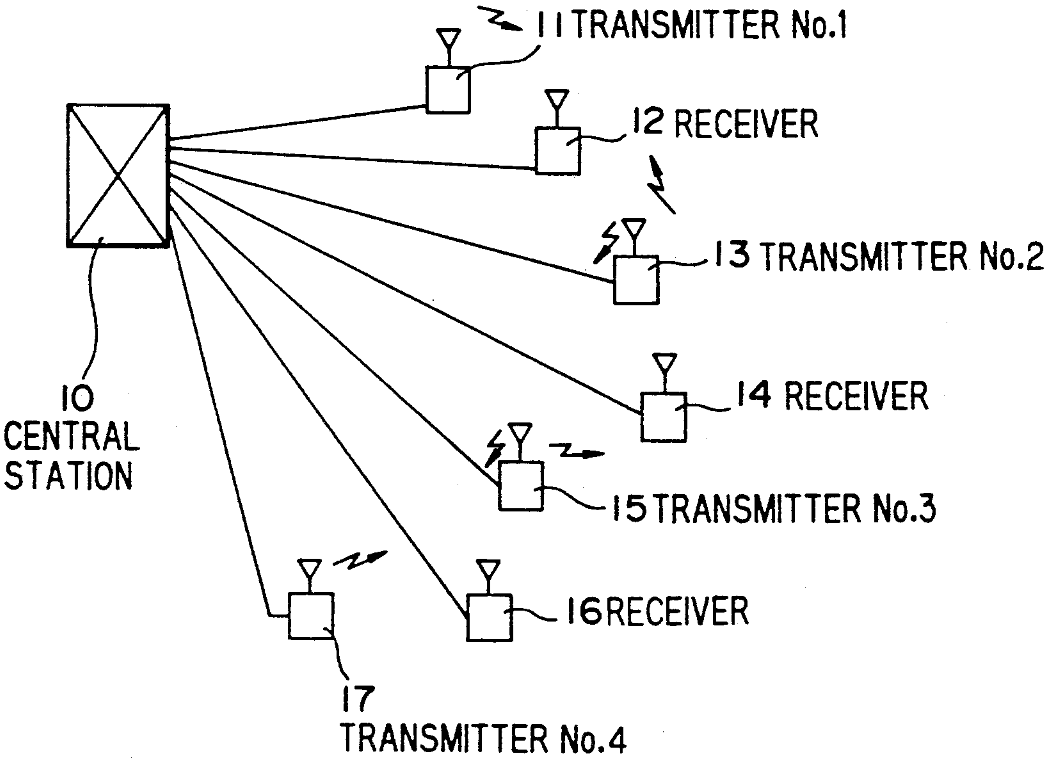
FIG. 1 is a block diagram showing a paging system which includes a phase adjusting system.

FIG. 1 shows a paging system which comprises a central station 10 including a phase adjusting system to be described later, transmitters (Nos. 1 to 4) 11, 13, 15 and 17 receiving signal from the central station 10, and receivers 12, 14 and 16 positioned between the transmitters 11 and 13, 13 and 15, and 15 and 17.

Figure 2:
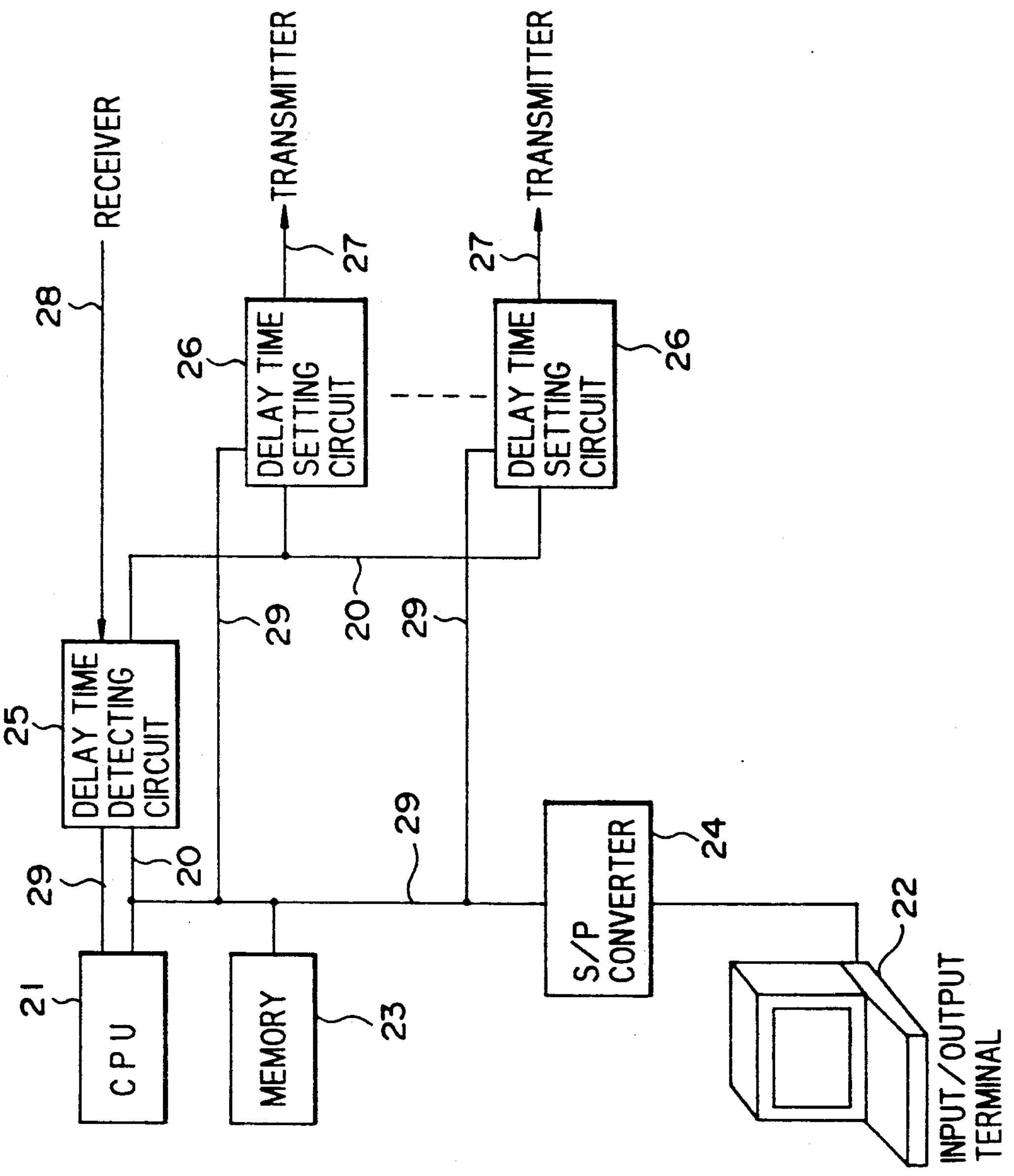
FIG. 2 is a block diagram showing a phase adjusting system for a paging system in an embodiment according to the invention.

FIG. 2 shows a phase adjusting system in an embodiment according to the invention which is included in the central station 10 as shown in FIG. 1. The phase adjusting system comprising a CPU 21 for controlling the whole system, an input/output terminal 22 for input of command, parameter etc. for the phase adjustment and for output of control result, a memory 23 for storing the parameter etc., a serial/parallel converter 24 for conversion between serial signal and parallel signal, a delay time detecting circuit 25 for detecting delay time of signal from one of the receivers 12, 14 and 16, and delay time setting circuits 26 each setting delay time of signal for a corresponding one of the transmitters 11, 13, 15 and 17. In the phase adjusting system, the CPU 21 is connected through a signal line 20 to the delay time detecting circuit 25 which is also connected through signal lines 20 to the delay time setting circuits 26. The delay time detecting circuit 25 is connected through signal lines 28 to the respective receivers 12, 14 and 16, and each of the delay time setting circuits 26 is connected through a signal line 27 to a corresponding one of the transmitters 11, 13, 15 and 17. Further, the memory 23 and the delay time setting circuits 26 are connected by address/data buses 29.

Figures 3, 4A, 4B:
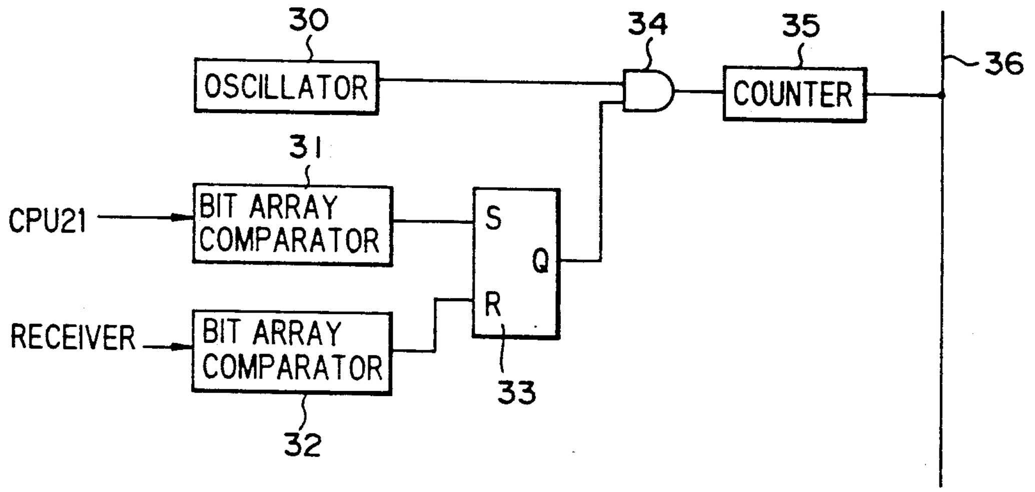
FIG. 3 is a block diagram showing a delay time detecting circuit in the phase adjusting system shown in FIG. 2, FIGS. 4A and 4B are tables storing relations between target number and reference number, and between sequented number and the target number.

FIG. 3 shows the delay time detecting circuit shown in FIG. 2 which comprises an oscillator 30 for generating pulse signal, a bit array comparator 31 for supplying "1" signal to a terminal S of a flip-flop circuit 33 when the comparators 31 detects specified bit array signal in signal from the CPU 21, a bit array comparator 32 for supplying "1" signal to a terminal R of the flip-flop circuit 33 when the comparator 32 detects the specified bit array signal in signal from one of the receivers 12, 14 and 16, an AND circuit 34 for passing the pulse signal dependent on output of a terminal Q of the flip-flop circuit 33, and a counter 35 for counting the pulse signal and connected through an address/data bus 36 to the CPU 21.

FIGS. 4A and 4B show tables stored in the memory 23, wherein the first table of FIG. 4A stores a corresponding relation between a target transmitter and a reference transmitter as designated by the aforementioned numbers 1 to 4 of the transmitters 11, 13, 15 and 17, and the second table of FIG. 4B stores the aforementioned sequential order of the target transmitter which is subject to the phase adjustment as also designated by the same transmitter numbers 1 to 4.

Figure 5:
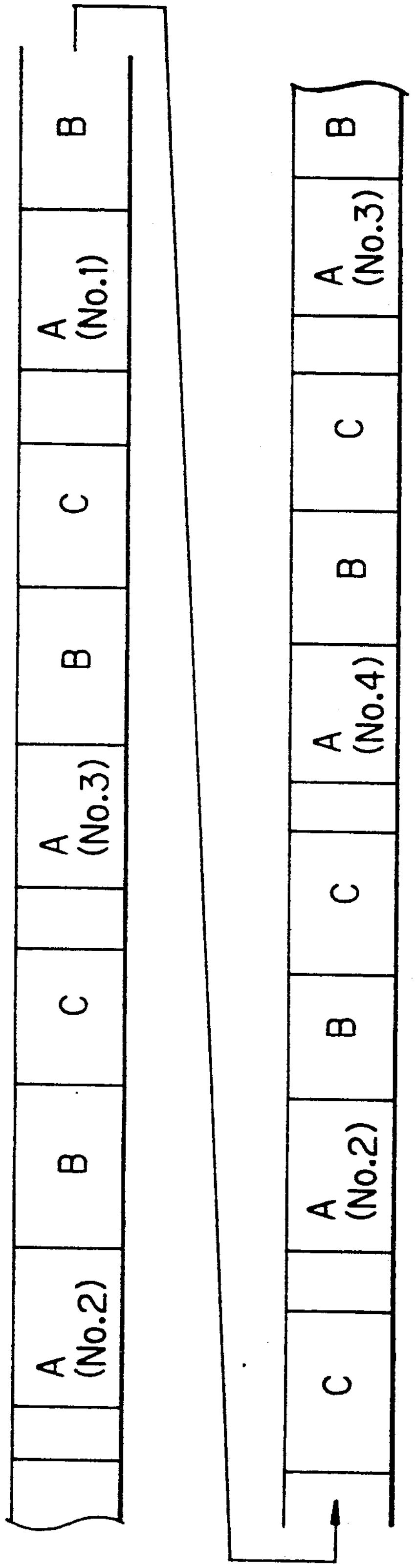
FIG. 5 is an explanatory diagram showing phase adjusting signal to be transmitted to transmitters.
Figure 6:
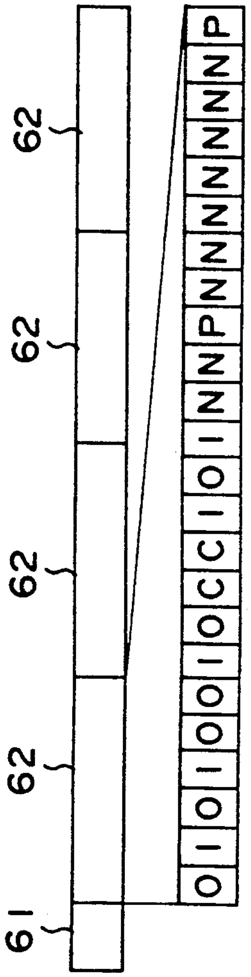
FIG. 6 is an expalanatory diagram showing control signal for turning on transmitting output of a transmitter.
Figure 7:
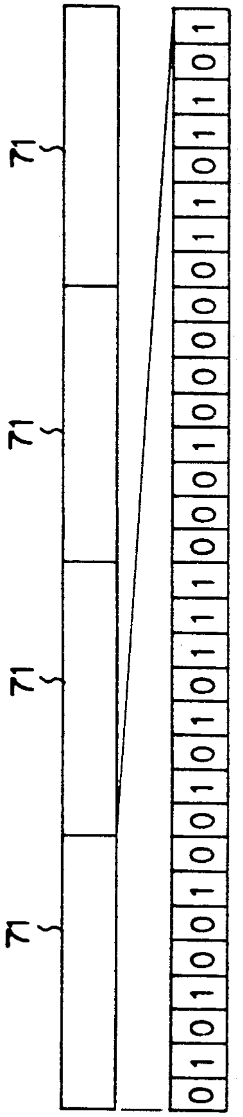
FIG. 7 is an explanatory diagram showing control signal for turning off the transmitting output of the transmitter.
Figure 8:
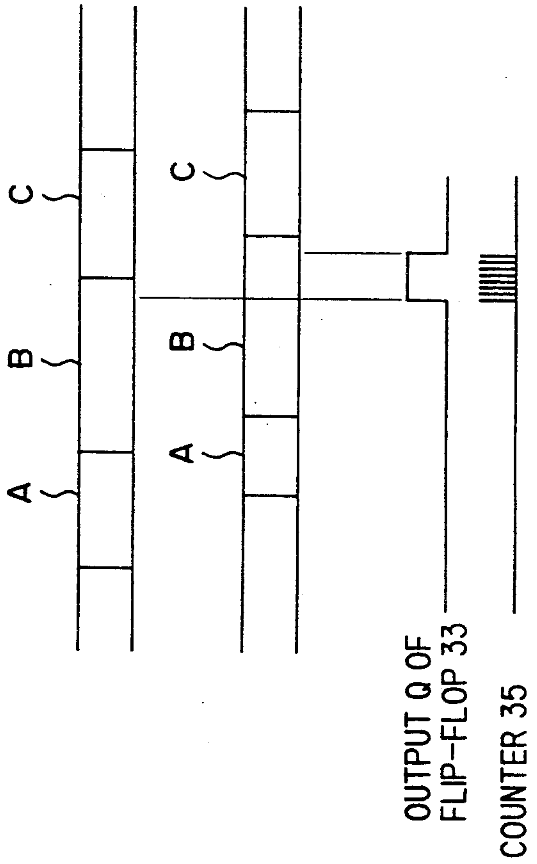
FIG. 8 is a chart for explaining the detection of delay time in the delay time detecting circuit in FIG. 3.

In operation, phase adjusting signal is supplied in addition to radio calling signal from the CPU 21 in the central station 10. The phase adjusting signal is serial signal including several blocks of signal as shown in FIG. 5. That is, the phase adjusting signal is composed of a first control signal portion A including the number of a transmitter to be designated and control code for turning on transmitting output of a designated transmitter, a delay time detecting signal portion B including specified bit array, and a second control signal portion C including control code for turning off the transmitting output. The first control signal portion A includes bit synchronous signal 61 of eight bits and plural frames, for instance, four frames of control signal 62 as shown in FIG. 6. The control signal 62 is of twenty-four bits wherein bits C are for turning on a target transmitter, a reference transmitter, or the both transmitters dependent on content thereof, bits N are for indicating the number of a target or reference transmitter to be designated, and bits P are for odd parity. The control code for turning off the transmitting output in the portion C includes plural frames, for instance, four frames of control signal 71 as shown in FIG. 7. The reason why the control signals 62 and 71 are of plural frames is that one of the plural frames is surely received in a corresponding transmitter even if one of the remaining frames fails to be received therein due to error induced in some trouble. On the other hand, nine stage PN (Pseudo Noise)signal is used in one example for the delay time detecting signal portion B. The nine stage PN signal is characterized in that specified nine bit array, for instance, "010010111" appears in one period only by one time. The character of the nine stage PN signal is utilized in the bit array comparators 31 and 32 in which specified nine bit arrays are set, so that the bit array comparators 31 and 32 detect the specified bit arrays among bit arrays from the CPU 21 and the receivers 12, 14 and 16. Serial data from the CPU 21 are monitored in the bit array comparator 31, so that signal "1" is supplied from the bit array comparator 31 to the terminal S of the flip-flop 33 when specified bit array is detected from the delay time detecting signal portion B of the phase adjusting signal. As a result, the output Q of the flip-flop 33 becomes "1" as shown in FIG. 8, so that the pulse signal from the oscillator 30 is passed through the AND circuit 34 to the counter 35 in which the pulse signal is counted. Simultaneously, serial data received through the signal line 28 from one of the receivers 12, 14 and 16 are monitored in the bit array comparator 32, so that signal "1" is supplied from the bit array comparator 32 to the terminal R of the flip-flop 33 when the specified bit array is detected. As a result, the output Q of the flip-flop 33 becomes "0" as shown in FIG. 8, so that the pulse signal is not passed through the AND circuit 34. At this moment, the counted value is kept in the counter 35, and then read therefrom through the address/data bus 29 to the CPU 21. Therefore, the counter 35 is reset to be ready for following counting operation, while delay time is calculated in the CPU 21 in accordance with the counted value of the counter 35. The phase adjustment is performed by decreasing the difference, between delay time of a signal line connected to a reference transmitter and delay time of a signal line connected to a target transmitter, down to a sufficiently small value. Therefore, the delay time of the both target and reference transmitters is necessary to be detected. For this purpose, one of the transmitters 11, 13, 15 and 17 is designated as "reference", and the other is as "target". At first, the target number "2" corresponding to the sequence number "1"0 is read from the table (FIG. 4B) in the memory 23, so that the aforementioned phase adjusting signal, by the control signal portion A of which the transmitter (No. 2) 13 is designated, is produced in the CPU 21 as shown in FIG. 5. Thus, delay time of the transmitter (No. 2) 13 is detected in the delay time detecting circuit 25. Secondly, the reference number "3" corresponding to the target number "2" is read from the table (FIG. 4A) in the memory 23, so that the phase adjusting signal, by the control signal portion A of which the transmitter (No. 3) 15 is designated, is produced as also shown in FIG. 5. In the same manner, delay time of the transmitter (No. 3) 15 is detected in the delay time detecting circuit 25. Thereafter, predetermined delay time is calculated dependent on the difference of delay time between the transmitters (Nos. 2 and 3) 13 and 15, and is newly set into the delay time setting circuit 26 corresponding to the target transmitter (No. 2) 13, so that the delay time difference is sufficiently decreased down to a sufficiently small value, whereby the phase adjustment of the transmitter (No. 2) 13 is completed. Thirdly, the target number "1" corresponding to the sequence number "2" is read from the table (FIG. 4B), so that the detection of delay time is performed for the target transmitter (No. 1) 11 Fourthly, the reference number "2" corresponding to the target number "1" is read from the table (FIG. 4A), so that delay time of the reference transmitter (No. 2) 13 is detected. As a result, further predetermined delay time is set into the delay time setting circuit 26 corresponding to the target transmitter (No. 1) 11. The other transmitters are adjusted in phase by the phase adjusting signal of FIG. 5 produced in accordance with the tables of FIGS. 4A and 4B in the same manner as described above.

Figures 9, 10:
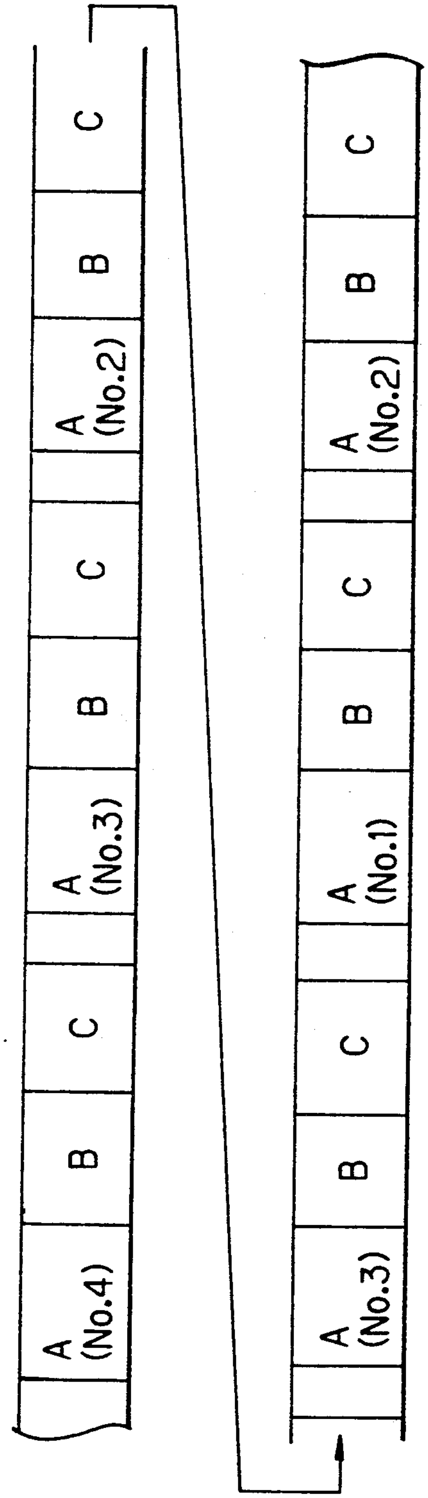
FIG. 9 is the table for changing the sequential order of target transmitters.
FIG. 10 is an explanatory diagram showing phase adjusting signal to be transmitted to transmitters in accordance with the table in FIG. 9.

In a case where the sequential order of transmitters to be adjusted in phase is changed, command having parameter of sequence number and target number is supplied from the input/output terminal 22 to the CPU 21, so that the command is analized in the CPU 21. Where the command is determined in the CPU 21 that the command is for changing relation between target number and sequence number, content of the table is changed from FIG. 4B to FIG. 9 as ordered by an operator of the input/output terminal 22. In accordance with the table of FIG. 9, the phase adjusting signal including the first control signal portion A, the delay time detecting signal portion B, and the second control signal portion C is produced as shown in FIG. 10. As clearly understood from FIGS. 9 and 10, the transmitters (Nos. 4, 2 and 1) 17, 13 and 11 are sequentially adjusted in phase in the same manner as described before. Therefore, the sequential order can be changed among plural transmitters without changing the number assigned to the transmitters.

Although the invention has been described with respect to specific embodiment for complete and clear disclosure, the appended claims are not to thus limited but are to be construed as embodying all modification and alternative constructions that may occur to one skilled in the art which fairly fall within the basic teaching herein set forth.

What is claimed is:

1. A phase adjusting system for a radio communication system, comprising:

a plurality of transmitters each having a target number for making a phase adjustment, and being connected to a central station by a transmission line;

a plurality of receivers, each of which receives a transmitted signal from a corresponding one of said transmitters;

delay time setting circuits provided in said central station, each of said delay time setting circuit setting a delay time for a corresponding one of said transmitters;

delay time detecting means provided in said central station for detecting a delay time of a target transmitter selected from said transmitters by said target number to produce a detection signal representative of said delay time, each of said receivers being connected to said delay time detecting means by a transmission line;

a memory for storing target numbers for said transmitters in a sequential order to determine the order of said phase adjustments among said transmitters, said memory being provided in said central station;

an input/output terminal provided in said central station to input instructions for changing a content of said memory; and controlling means provided in said central station and responsive to said detection signal for controlling said delay time setting circuits, said delay time detecting means, said memory, and said input/output terminal in a predetermined operation, whereby said delay time detecting means calculates a delay time difference between said delay time of said target transmitter and a reference delay time, and sets a predetermined delay time calculated dependent on said delay time difference in said delay time setting circuit of said target transmitter to adjust a phase of said target transmitter;

wherein said sequential order of said target numbers is changed in said memory in response to said instruction supplied from said input/output terminal to said controlling means to change a phase adjusting order of said transmitters without changing said target number.

2. A phase adjusting system for a radio communication system comprising:

a plurality of transmitters each having a target number for making a phase adjustment, and being connected to a central station by a transmission line;

a plurality of receivers, each of which receives a transmitted signal from a corresponding one of said transmitters;

delay time setting circuits provided in said central station, each of said delay time setting circuit setting a delay time for a corresponding one of said transmitters;

delay time detecting means providing in said central station for detecting a delay time of a target transmitter selected from said transmitters by said target number to produce a detection signal representative of said delay time, each of said receivers being connected to said delay time detecting means by a transmission line;

a memory for storing target numbers for said transmitters in a sequentially order to determine the order of said phase adjustments among said transmitters, said memory being provided in said central station;

an input/output terminal provided in said central station to input instructions for changing a content of said memory; and controlling means provided in said central station and responsive to said detection signal for controlling said delay time setting circuits, said delay time detecting means, said memory, and said input/output terminal in a predetermined operation, whereby said delay time detecting means calculates a delay time difference between said delay time of said target transmitter and a reference delay time, said reference delay time being a delay time which is detected in regard to a reference transmitter selected from said transmitters by said delay time detecting means, and sets a predetermined delay time calculated dependent on said delay time difference in said delay time setting circuit of said target transmitter to adjust a phase of said target transmitter;

wherein said sequential order of said target numbers is changed in said memory in response to said instruction supplied from said input/output terminal to said controlling means to change a phase adjusting order of said transmitters without changing said target number.

3. A phase adjusting system for a ratio communication system, according to claim 2:

wherein said reference transmitter is designated among said transmitters by a reference numbed which is assigned to one of said transmitters in relation to said target transmitter, said reference number being stored in said memory along with said target transmitter.

4. A phase adjusting system for a radio system, comprising:

a plurality of transmitters, each of said transmitters having a target number for phase adjustment, and being connected to a central station by a transmission line, thereby receiving a phase adjusting signal including a transmitting command having a target number signal and a synchronous signal of a predetermined bit pattern from said central station, and transmitting said synchronous signal to the air when said target number coincides with a target number included in said target number signal;

a plurality of receivers, at least one of said receivers receiving said synchronous signal from a transmitter designated by said target number signal among said transmitters and transmitting said synchronous signal through said transmission line to said central station;

a plurality of delay time setting circuits provided in said central station, each of said delay time setting circuits setting a delay time for a corresponding one of said transmitters;

delay time detecting means provided in said central station to detect a delay time of a reference transmitter selected from said transmitters in response to a reference number transmitted from said central station through said transmission line to said reference transmitter, and a delay time of said designated transmitter, said delay time of said reference transmitter being detected by receiving a synchronous signal from at least one receiver which is receiving said synchronous signal transmitted to the air by said reference transmitter said delay time detecting means producing detection signals respectively representative of said delay times of said reference and designated transmitters, each of said receivers being connected to said delay time detecting means by a transmission line;

a memory for storing a first table of target numbers for said transmitters in a sequential order to determine the order of said phase adjustments among said transmitters, and a second table of at least one reference number corresponding to said target numbers, said memory being provided in said central station;

an input/output terminal provided in said central station to input instructions for changing contents of said first and second tables stored in said memory; and controlling means provided in said central station and responsive to said detection signals for controlling said delay time setting circuits, said delay time detecting means, said memory, and said input/output terminal in a predetermined operation, whereby said delay time detecting means calculates a delay time difference between said delay times of said reference and target transmitters, and sets a predetermined delay time calculated dependent on said delay time difference in said delay time sitting circuit for said designated transmitter to adjust a phase of said target transmitter;

wherein a target number signal is read from said first table, and a reference number signal corresponding to said read target number signal is read from said second table, whereby a command having said read target number signal and a synchronous signal are transmitted from sad central station through transmission lines to said transmitters, and a command having said read reference number signal and a synchronous signal are transmitted from said central station through transmission lines to said transmitters, and whereby the order of adjusting a phase is changed without changing said target number by changing a content of said first table stored in said memory.

* * * * *